United States Patent [19]
Gazzard et al.

[11] 3,970,755
[45] July 20, 1976

[54] BIOCIDAL COMPOSITIONS

[75] Inventors: Edward George Gazzard; Michael Singer, both of Manchester, England

[73] Assignee: Imperial Chemical Industries Limited, London, England

[22] Filed: Apr. 25, 1974

[21] Appl. No.: 464,233

[30] Foreign Application Priority Data
May 10, 1973 United Kingdom............... 22353/73

[52] U.S. Cl................................. 424/270; 424/329
[51] Int. Cl.² ...................... A01N 9/12; A01N 9/20; A01N 9/22
[58] Field of Search..................... 424/263, 329, 270

[56] References Cited
UNITED STATES PATENTS

| | | | |
|---|---|---|---|
| 2,676,986 | 4/1954 | Wakeman et al..................... | 424/76 |
| 3,360,470 | 12/1967 | Wixon................................. | 252/99 |

FOREIGN PATENTS OR APPLICATIONS 884,541   12/1961   United Kingdom

OTHER PUBLICATIONS

Applied Microbiol. 14(3), 308–319 (1966) Hueck et al., Bacteriostatic, Fatty Nitrogen Compounds.

*Primary Examiner*—Albert T. Meyers
*Assistant Examiner*—D. W. Robinson
*Attorney, Agent, or Firm*—Cushman, Darby & Cushman

[57] ABSTRACT

Biocidal compositions comprising certain quaternary ammonium compounds and 1,2-benzisothiazolin-3-ones. The combination has a greater biocidal activity than would be expected from either component alone. Also methods for protecting aqueous media against infection by micro-organisms by addition of the said compositions to the media, and methods for protecting paint films and wood against fungal attack using the said compositions and anti-fungal agents.

5 Claims, No Drawings

BIOCIDAL COMPOSITIONS

This invention relates to biocidal compositions and more particularly to combinations and complexes of known biocides having improved effectiveness.

UK Patent Specification No. 884,541 relates to a process for the protection of aqueous media against infection by micro-organisms by adding to the aqueous media a 1,2-benzisothiazolin-3-one which may be substituted in the benzene ring by chlorine or bromine, or salts thereof.

Also known to have biocidal activity are quaternary ammonium compounds in which one at least of the substituents on the nitrogen atom is a long-chain alkyl group or an alkyl phenoxyethoxyethyl group.

It has now been found that certain 1,2-benz isothiazolin-3-one compounds and quaternary ammonium compounds in admixture are particularly effective biocides.

According to the present invention there are provided biocidal compositions comprising:

A(i) a quaternary ammonium compound of the general formula

    Formula I wherein R represents a $C_{10}$–$C_{22}$ alkyl group or a $C_1$–$C_9$ alkylphenoxyethoxyethyl group, or a phenoxyethyl group.

$R_1$ represents a $C_{10}$ – $C_{22}$ alkyl group, a $C_1$ – $C_4$ alkyl group or a benzyl group, $R_2$ and $R_3$ each independently represent a $C_1$ – $C_4$ alkyl group and $X^-$ represents an anion or (ii) a quaternary ammonium compound of the general formula

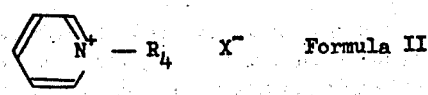    Formula II wherein $R_4$ represents an optionally substituted $C_{10}$ – $C_{22}$ alkyl group, $X^-$ represents an anion, and wherein the heterocyclic nucleus may be fused with a benzene nucleus adjacent to the nitrogen atom and which may carry an amino substituent; and B. a substituted or unsubstituted 1,2-benz isothiazolin-3-one compound having the general formula

    Formula III wherein the benzene nucleus may carry substituents selected from halogen atoms $C_1$–$C_4$ alkyl groups, $C_1$–$C_4$ alkoxy groups, the nitro group and the cyano group.

As examples of the alkyl groups which are represented by R and $R_1$ in the compounds of Formula I there may be mentioned the dodecyl group and the hexadecyl group.

As an example of the alkylphenoxyethoxyethyl group which R represents there may be mentioned the p-octylphenoxyethoxy ethyl group.

The groups $R_2$ and $R_3$ may be, for example, ethyl, propyl, isopropyl or the isomeric butyl groups but are preferably methyl groups.

The groups $R_4$ in the compounds of Formula II may be, for example, a dodecyl group or a hexadecyl group, and as an example of a substituent which may be present in the group $R_4$ there may be mentioned a substituted or unsubstituted pyridinium radical as defined in Formula II.

As examples of the anions which are represented by $X^-$ there may be mentioned the chloride, bromide, acetate or methosulphate ions.

Specific examples of the quaternary ammonium compounds of Formula I and Ii are dodecyl benzyl dimethyl ammonium chloride, hexadecyl trimethyl ammonium bromide, hexadecyl pyridinium chloride, 4-aminoquinaldinium dodecyl acetate, didecyl dimethyl ammonium chloride and dioctyl dimethyl ammonium chloride. The preferred compound is a dodecyl (lauryl) benzyl dimethyl ammonium salt.

As examples of 1,2-benz isothiazolin-3-ones which may be employed together with the quaternary ammonium compounds of Formulae I and Ii there may be mentioned 1,2-benz isothiazolin-3-one itself and the 5- and 6-chloro and 5-methyl derivatives thereof.

The molar ratio of substituted or unsubstituted 1,2-benz isothiazolin-3-one as hereinbefore described, to quaternary ammonium compound in the compositions of the present invention may be varied widely, but will generally be in the range 1.0 : 0.04 to 1.0 : 1.0. The combination of the quaternary ammonium compound and the benzisothiazolinone has a biocidal activity greater than that which would be expected as the sum of the activities of the individual components.

It is preferred that the composition comprising the quaternary ammonium compound and the benzisothiazolinone is in the form of a complex of the two compounds in which there is one benzisothiazolinone group for each quaternary ammonium group in the quaternary ammonium compound.

These complexes according to the present invention may be prepared by mixing an aqueous solution of an alkali metal, preferably sodium, salt of the benzisothiazolone with an aqueous solution of the quaternary ammonium compound in stoichiometric proportions. The complex separates and may be purified by dissolving it in an organic solvent, separating any insoluble impurities, washing the solution with water, drying the solution and removing the solvent by evaporation or distillation under reduced pressure.

The biocidal compositions of the present invention find application as bactericides and fungicides, particularly in aqueous media, for example, water-oil emulsions, in-can preservation of water-based paints and adhesives and in cooling water systems; also as paint-film fungicides and in preventing fungal attack on wood. The compositions are also effective in the presence of anionic compounds, for example, soap, which are not compatible with quaternary ammonium biocides alone.

Thus the present invention also provides a method for protecting aqueous media against infection by micro-organisms, and controlling or preventing the proliferation of micro-organisms in aqueous media already infected thereby, which comprises adding to the aqueous media from 1 to 1,000 parts per million of a biocidal composition comprising in admixture a quaternary ammonium compound and a substituted or unsubstituted 1,2-benzisothiazolin-3-one as hereinbefore described.

A further feature of the invention provides a method for the protection of paint films against fungal attack wherein there is added to the paint before its application to a surface, a biocidal composition comprising in admixture a quaternary ammonium compound and a substituted or unsubstituted 1,2-benzisothiazolin-3-one as hereinbefore described, in amount to provide a concentration in the in the paint of 500 to 10,000 parts per million.

A still further feature of the invention provides a method for the protection of wood against fungal attack wherein the wood is treated with a solution of a composition comprising in admixture a quaternary ammonium compound and a substituted or unsubstituted 1,2-benzisothiazolin-3-one as hereinbefore described, the solution containing from 50 to 20,000 paste per million of the composition.

The treatment of the wood may be by dipping, brushing or spraying with a solution of the composition, in which case the solution may be aqueous or substantially aqueous. For example, a 50% solution of the composition in propylene glycol may be added to water to give a substantially aqueous solution of the complex having the desired strength. The wood so treated may then be allowed to dry at normal temperatures or the drying may be accelerated by heating the treated wood for some time at an elevated temperature, for example, up to 50°C for several hours.

Alternatively the wood may be treated by vacuum or pressure impregnation, in which case the composition may be applied from a non-aqueous medium, for example, a hydrocarbon medium such as toluene, petroleum spirit or mixtures thereof.

The invention is illustrated but not limited by the following Examples in which parts and percentages are by weight unless otherwise stated, the ratio of parts by weight to parts by volume being that of the kilogram to the liter.

EXAMPLE 1

To 6.06 parts of 1.2-benzisothiazolin-3-one is added 40.62 parts of a solution of sodium hydroxide prepared by dissolving 2.056 parts of sodium hydroxide in 50 parts of water. The mixture is warmed to effect solution and there is then added, with stirring, 28.10 parts of a 48.5% aqueous solution of lauryl benzyl dimethyl ammonium chloride. An immediate phase separation occurs and the two-phase system is warmed for 2 hours at 90°–100°C.

The lower layer (20.09 parts) is separated and is dried overnight in a vacuum oven at room temperature. The product is dissolved in 250 parts of benzene and the solution is heated under reflux using a Dean and Stark separator to remove water from the refluxing mixture. The benzene solution is cooled and filtered. The filtrate is washed with four separate portions of 50 parts of water and is then dried over anhydrous magnesium sulphate. The drying agent is removed by filtration and the benzene solution is evaporated to dryness under vacuum. The residual product, 16.7 parts, contains 0.1% of chloride ion and its infra-red spectrum indicates the presence of both benzisothiazolin-3-one and quaternary ammonium components.

EXAMPLE 2

Comparison between the bactericidal activity of 1.2-benzisothiazolin-3-one (BIT) and the complex from the latter compound and lauryl benzyl dimethyl ammonium chloride (LBDAC).

1 ml. of an overnight broth culture of the bacterium *Pseudomonas aeruginosa* is introduced into each of 100 ml. volumes of test solutions of the biocides in 250 ml. conical flasks, at concentrations of 1000, 500, 250 and 100 p.p.m. respectively.

The test solutions are prepared from a solution of 1.0 g. of the biocide in 100 ml. methanol/water 1 : 1 v/v by dilution with water to give a test solution of the desired strength. Thus a test solution containing 1000 p.p.m. of biocide also contains 5% methanol, and lower concentrations of biocide proportionally less methanol. Each culture is then incubated on a rotary shaker at 25°C and samples are removed after 2 hours and 6 hours in order to determine the number of surviving cells. Results are as follows:

|  | Concentration of biocide (p.p.m.) | Surviving cells/ml. after: | |
|---|---|---|---|
|  |  | 2 hours | 6 hours |
| BIT | 1000 | $8.0 \times 10^6$ | 0 |
|  | 500 | $>3.0 \times 10^7$ | 0 |
|  | 250 | $>3.0 \times 10^7$ | $>3.0 \times 10^7$ |
|  | 100 | $>3.0 \times 10^7$ | $>3.0 \times 10^7$ |
| Equimolecular complex of BIT and LBDAC | 1000 | 0 | 0 |
|  | 500 | 0 | 0 |
|  | 250 | 0 | 0 |
|  | 100 | $1.0 \times 10^3$ | 0 |
| Control (no biocide) |  | $>3.0 \times 10^7$ | $>3.0 \times 10^7$ |
| Control (5% aqueous methanol) |  | $>3.0 \times 10^7$ | $>3.0 \times 10^7$ |

It is clear from the above that the complex has a higher bactericidal activity than the same amount of 1.2-benzisothiazolin-3-one alone.

The 5% aqueous methanol control represents the highest concentration of methanol in any of the tests, and shows that the methanol has no detectable effect on the results.

EXAMPLE 3

Comparison of the fungicidal activity of 1.2-benzisothiazolin-3-one (BIT) and the complex from the latter compound and lauryl benzyl dimethyl ammonium chloride (LBDAC).

Four 1 cm. square nylon meshes contaminated with overnight growth of *Aspergillus niger* are introduced into 100 ml. volumes of test solutions of the biocides in 250 ml. conical flasks, prepared as described in Example 2. Each culture is then incubated at 25°C on a rotary shaker. Two nylon squares are removed from each flask after a contact time of 3 hours and the remaining two squares after 6 hours. On removal from the solution each nylon square is vigorously shaken in 10 ml. of sterile water for 5 minutes and transferred on to a malt agar medium in a Petri dish. The latter is incubated for 3 days at 25°C, after which the survival or kill of the fungal mycelium is determined according to the presence or absence of fungal growth on the malt agar medium from the nylon mesh. Results are as follows:

|  | Concentration of biocide (p.p.m.) | Survival of fungus after contact time of: | |
|---|---|---|---|
|  |  | 3 hours | 6 hours |
| BIT | 1000 | – | – |
|  | 500 | – | – |
|  | 250 | – | – |
|  | 100 | +++ | +++ |
| Complex | 1000 | – | – |
|  | 500 | – | – |
|  | 250 | – | – |
|  | 100 | – | – |
| Control (no biocide) |  | +++ | +++ |
| Control (5% aqueous methanol) |  | +++ | +++ |

In the above qualitative assessment +++ indicates vigorous growth, while – indicates total kill. It is clear that the complex has a higher fungicidal activity than 1.2- benzisothiazolin-3-one alone.

EXAMPLE 4

Comparison of the bacteriostatic and fungistatic activity of 1.2-benzisothiazolin-3-one (BIT) and the complex from the latter compound and lauryl benzyl dimethyl ammonium chloride (LBDAC).

1.2 Benzisothiazolin-3-one and the complex are each dissolved in a 1:1 v/v methanol/water solvent, and the solutions are added to nutrient agar and to malt agar to provide concentrations of 20, 40, 60, 80, 100 and 200 p.p.m. of the active ingredient. The test bacteria, *Escherichia coli*, *Staphylococcus aureus* and *Pseudomonas aeruginosa* are streak inoculated on to the surface of nutrient agar in Petri dishes at the concentrations indicated above. The test fungi *Altenaria tenuis*, *Pullularia pullulans*, *Chaetomium globosum*, *Polystictus versicolor*, *Trichoderma viride* and *Aspergillus niger* are similarly inoculated (point inoculum) on to the malt agar medium. The nutrient agar plates are incubated for 1 day at 37°C and the malt agar plates are incubated for 7 days at 28°C, and then examined for the presence or absence of growth. Results are as follows:

|  | Minimal inhibitory concentration (p.p.m.) against | | |
|---|---|---|---|
|  | Ps. aeruginosa | E. coli | Staph.aureus |
| BIT | 40 | 20 | 20 |
| Complex | 100 | 20 | 20 |

|  | Minimal inhibitory concentration (p.p.m.) against | | | | | |
|---|---|---|---|---|---|---|
|  | A. tenuis | P. pullulans | Ch. globosum | P. versicolor | T. viride | A. niger |
| BIT | <20 | 60 | 40 | <20 | 40 | 200 |
| Complex | <20 | <20 | <20 | <20 | 40 | 60 |
| LBDAC | 80 | <20 | 200 | <20 | 200 | >200 |

From the above it can be seen that the fungistatic activity of the complex is, in general, somewhat greater than that of either component of the complex used alone.

EXAMPLE 5

Comparison of the fungicidal activity of 1.2 - benzisothiazolin-3-one (BIT) alone and together with the cationic compounds lauryl benzyl dimethyl ammonium chloride (LBDAC), cetyl trimethyl ammonium bromide (CTAB) and cetyl pyridinium chloride (CPC), the nonionic adduct of nonylphenol with 8 mols of ethylene oxide and the anionic sodium dioctyl sulphosuccinate (SDSS).

Sterilised 1 cm. square nylon meshes on malt agar are seeded with a spore suspension of Aspergillus niger and incubated for 24 hours at 25°C, after which time the mesh is covered with fungal mycelium while no spore formation has commenced. Each test biocidal composition is prepared at the required concentration in a 100 ml. volume of water in a 250 ml. conical flask. Four fungus-seeded squares are transferred into each flask and the flasks are then rotated on an orbital shaker. Two meshes are removed from each flask after 3 hours and the remaining two meshes after 6 hours of incubation. Each mesh is vigorously shaken in 15 ml. of sterile water before being transferred on to a malt agar plate. The latter is incubated for 3 days at 25°C after which the nylon meshes are examined for the presence or absence of fungal growth. A complete kill of the fungal mycelium is indicated by the absence of any growth on or around the nylon mesh on the malt agar plate.

Results are as follows:

|  | Survival of fungus after contact time of | |
|---|---|---|
| Biocide (p.p.m.) | 3 hours | 6 hours |
| Control (no biocide) | +++ | +++ |
| BIT* (1000) | +++ | + |
| BIT* (100) | +++ | +++ |
| BIT (100) + LBDAC (20) | – | – |
| BIT (100) + LBDAC (10) | + | – |
| BIT (100) + CTAB (20) | + | – |
| BIT (100) + CTAB (10) | ++ | – |
| BIT (100) + CPC (20) | ++ | – |
| BIT (100) + CPC (10) | ++ | + |
| BIT (100) + adduct (10) | +++ | +++ |
| BIT (100) + SDSS (10) | +++ | +++ |
| LBDAC (20) | +++ | +++ |
| CTAB (20) | +++ | +++ |
| CPC (20) | +++ | +++ |
| Adduct (10) | +++ | +++ |
| SDSS (10) | +++ | +++ |

*In this case the BIT was used in the form of a solution of BIT (33.3%) in ethylenediamine (24.0%) and water (42.7%) (percentages by weight).

In the above table +++, ++ and + indicate vigorous growth, moderate growth and slight growth respectively, and – indicates total kill.

The above tests show that, in the presence of the cationic compounds lauryl benzyl dimethyl ammonium chloride, cetyl trimethyl ammonium bromide and cetyl pyridinium chloride, 1.2 -benzisothiazolin-3-one is more effective as a fungicide than when used alone. It is also apparent that the non-ionic nonylphenol ethylene oxide adduct and the anionic sodium dioctyl sulphosuccinate surfactants do not have a similar effect with the 1.2-benzisothiazolin-3-one.

The experiment described below shows in greater detail the effect obtained by using 1.2-benzisothiazolin-3-one and lauryl benzyl dimethyl ammonium chloride in combination. All other details are as described above.

| Biocide (p.p.m.) |  | Survival of fungus after contact time of: | | | |
|---|---|---|---|---|---|
|  |  | 1 hour | 2 hours | 4 hours | 6 hours |
| BIT* | 1000 | +++ | + | + | – |
|  | 500 | +++ | +++ | +++ | +++ |
|  | 100 | +++ | +++ | +++ | +++ |
|  | 50 | +++ | +++ | +++ | +++ |
| LBDAC | 50 | +++ | +++ | +++ | +++ |
| LBDAC | 20 | +++ | +++ | +++ | +++ |
| LBDAC | 10 | +++ | +++ | +++ | +++ |
| BIT(100) + LBDAC(20) | | +++ | + | – | – |

-continued

| Biocide (p.p.m.) | Survival of fungus after contact time of: | | | |
|---|---|---|---|---|
| | 1 hour | 2 hours | 4 hours | 6 hours |
| BIT(100) + LBDAC(10) | +++ | +++ | − | − |
| BIT (50) + LBDAC(10) | + | + | + | − |

*The BIT in this case was used in the form of a solution in aqueous ethylene diamine as described in the first part of this Example.

EXAMPLE 6

Comparison of the bactericidal activity of 1.2-benzisothiazolin-3-one (BIT) alone and together with lauryl benzyl dimethyl ammonium chloride (LBDAC), the adduct of nonylphenol with 8 mols of ethylene oxide and sodium dioctyl sulphosuccinate (SDSS).

Test biocide solutions are prepared at the required concentration in 100 ml. volumes of water in 250 ml. conical flasks. The control consisted of 100 ml. of sterile water. A 1 ml. suspension of a 24 hour culture of Pseudomonas aeruginosa is transferred into each flask, and the flasks are then incubated at 25°C in an orbital shaker. The numbers of surviving bacteria are determined after 1,2 and 6 hours. Results are as follows:

| Biocide (p.p.m.) | Survival of bacteria (count per ml.) after: | | |
|---|---|---|---|
| | 1 hour | 2 hours | 6 hours |
| BIT* (1000) | >300 × $10^5$ | >300 × $10^5$ | <10 |
| BIT* (100) | >300 × $10^5$ | >300 × $10^5$ | >300 × $10^5$ |
| LBDAC (10) | 30 × $10^5$ | 42 × $10^4$ | 120 × $10^3$ |
| Adduct (10) | >300 × $10^5$ | >300 × $10^5$ | >300 × $10^5$ |
| SDSS (10) | >300 × $10^5$ | >300 × $10^5$ | >300 × $10^5$ |
| BIT(100) + LBDAC(10) | 110 × $10^4$ | 57 × $10^3$ | <10 |
| BIT(100) + Adduct(10) | >300 × $10^5$ | >300 × $10^5$ | >300 × $10^5$ |
| BIT(100) + SDSS (10) | >300 × $10^5$ | >300 × $10^58$ | >300 × $10^5$ |
| Control | >300 × $10^5$ | >300 × $10^5$ | >300 × $10^5$ |

*The BIT in this case was used in the form of a solution in aqueous ethylene diamine as described in the first part of Example 5.

The benzisothiazolone-lauryl benzyl dimethyl ammonium chloride combination, in the ratio 100 ppm : 10 ppm shows activity after 6 hours whilst the other combinations do not, and is as active as 1000 ppm of the benzisothiazolone alone.

EXAMPLE 7

Comparison of 1.2-benzisothiazolin-3-one (BIT) and its complex with lauryl benzyl dimethyl ammonium chloride (LBDAC) as paint film fungicides.

The test biocides are mixed into an emulsion paint to provide the concentrations (w/w) in wet paint as shown below. A commercially available fungicide, 2 -(4'-thiazolyl) - benzimidazole, is used as a control. The paint in the can is then stored at 50°C for 2 weeks in order to simulate prolonged storage. The treated paint is applied to one side of a filter paper 5.5 cm. in diameter, and after 24 hours a second coat of paint is applied to the same side.

A second set of filter papers coated with two layers of treated paint is subjected to a weathering procedure consisting of a 24 hour leaching period in a standard spray cabinet (BS 3900 F4) and 24 hour heating in an oven at 65°C.

The filter papers are then transferred on to malt agar in a Petri dish (paint side uppermost) and inoculated with one of the two test fungi Pullularia pullulans and Alternaria tenuis. The inoculum consists of a visible suspension of the test organism sprayed over the painted filter paper and surrounding border of agar in the Petri dish. The inoculated paint films are incubated at 25°C for 5 days, after which the filter papers are examined for the presence or absence of fungal growth. Results are as follows:

| Compound (p.p.m.) | Minimal inhibitory level of biocide in paint film after | | | |
|---|---|---|---|---|
| | Storage | | Weathering | |
| | Alt. tenuis | P. Pullulans | Alt. tenuis | P. Pullulanus |
| Complex of BIT and LBDAC (1000,3000) | 1000 | 1000 | 3000 | 1000 |
| BIT(500, 1000, 2000, 3000) | 500 | 500 | 3000 | 3000 |
| 2-(4'-thiazolyl) benzimidazole (1000,3000) | 3000 | 1000 | 3000 | 1000 |

Since only one third of the weight of the complex is BIT, it is clear that the BIT is more active as a paint film fungicide when in the form of its complex with LBDAC than when used alone.

EXAMPLE 8

The activity of the 1,2-benzisothiazolin-3-one (BIT)/lauryl benzyl dimethyl ammonium chloride (LBDAC) complex as an antifungal agent in preventing the growth of cellulolytic fungi on wood.

Malt agar plates were sprayed with a suspension of Polystictus versicolor or Chrysosporium lignorum. Three cubical blocks of beech wood (sides 1 cm.) were soaked for 5 minutes in a 0.3% w/v aqueous solution of BIT/LBDAC complex, (i.e. containing 0.3 g. complex in 100 ml. solution; prepared by adding a 50% solution of complex in propylene glycol to water), dried at 50°C for 4 hours and eqiulibrated at room temperature for 20 hours.

A PV 900 (poly (vinyl chloride)) screen mesh which had previously been soaked in 70% ethanol for 36 hours and allowed to dry was transferred on to the innoculated agar surface in each plate. The three biocide-treated beechwood blocks were placed on the screen mesh and innoculated at 25°C for three weeks. The blocks were then examined for the presence or absence of fungal growth.

Results are as follows:

| Treatment | Growth on beech blocks of | |
|---|---|---|
| | Polystictus versicolor | Chrysosporium lignorum |
| Control (no biocide) | +++ | ++ |
| BIT/LBDAC complex 0.3% solution | − | − |

Key: +++ indicates vigorous growth
++ indicates moderate growth
− indicates no growth (total kill)

It is clear from these results that the BIT/LBDAC complex at the above-mentioned concentration presents the growth of the fungi on beech wood.

EXAMPLE 9

The effect of BIT/LBDAC complex in retarding the oxidation of nitrite by Nitrobacter in a model cooling tower system.

A model cooling tower system was constructed, consisting of a wooden frame supporting six wooden slats, the frame being mounted over a reservoir holding 10 liters of water containing sodium nitrite as a corrosion inhibitor. The water is then contaminated with 1 g. of cooling tower slime known to harbour Nitrobacter, and the water in the reservoir is directed to the top of the wooden slats by means of a Churchhill pump, so that the water trickles down over the slats and returns to the reservoir. If no biocide is added to the water the wooden slats become colonised by a Nitrobacter — containing slime which rapidly oxidises nitrite to nitrate.

Initially, the rate of loss of nitrite from the system was determined in the absence of biocide by removing water samples and analysing for nitrite content. The nitrite level was then adjusted to a higher concentration before 150 ppm. of BIT/LBDAC complex was added to the water. The 'cooling tower' water was then circulated for the necessary period until the concentration of nitrite was appreciably reduced, the water in the system was drained off and fresh nitrite – containing water was added. Before the next biocide for test was added, the rate of loss of nitrite in the biocide-free system was checked, to ensure that the nitrite-oxidising activity had normalised, i.e. all biocides were compared in the same system consecutively.

Results are as follows:

| Biocide and concentration added to water initially | Circulation time (days) | Nitrite level detected in water (ppm) |
|---|---|---|
| Control (no biocide) | 0 | 965 |
|  | 2 | 450 |
|  | 4 | 517 |
|  | 8 | 316 |
| LBDAC, 250 ppm. | 0 | 494 |
|  | 2 | 550 |
|  | 3 | 496 |
|  | 6 | 550 |
|  | 7 | 470 |
|  | 8 | 470 |
|  | 10 | 522 |
|  | 14 | 360 |
|  | 17 | 317 |
| Poly(hexamethylene biguanide) hydrochloride, 85 ppm. | 0 | 840 |
|  | 4 | 705 |
|  | 11 | 260 |
|  | 18 | 125 |
|  | 25 | 0 |
| BIT/LBDAC complex, 150 ppm. | 0 | 690 |
|  | 2 | 752 |
|  | 5 | 710 |
|  | 9 | 655 |
|  | 16 | 580 |
|  | 23 | 730 |
|  | 51 | 538 |
|  | 58 | 580 |

These results indicate that under the experimental conditions the BIT/LDBAC complex is markedly more effective than either LBDAC alone or poly(hexamethylene biguanide) hydrochloride (a well-known bactericide). Whereas these two compounds maintained the initial level of nitrite concentration for approximately 10 days and 4 days respectively, there was no significant fall in the nitrite level of the water treated with BIT/LBDAC complex after 58 days.

EXAMPLE 10

The efficiency of BIT/LBDAC complex in retarding the oxidation of nitrite by Nitrobacter in a cooling tower.

An all-wood cooling tower system, 25,000 gallons in capacity with a maximum temperature of 32°C. was used for this trail. Before the biocide was added the cooling water was bled so that addition of nitrite to give a concentration of 500 ppm the total dissolved solids were not more than 1,000 ppm. The biocide (BIT/LBDAC complex) was added at the distribution troughs at the top of the tower to give an initial concentration of 150 ppm. active ingredient.

The single dose of biocide controlled microbial activity and hence satisfactorily prevented loss of nitrite from the system for a period up to eight weeks. Comparison with quaternary ammonium compounds showed that BIT/LBDAC complex provides protection for at least 7 times longer than 250 ppm. of LBDAC alone.

EXAMPLE 11

In this test, combinations of BIT with LBDAC or Dequadin were compared for bactericidal activity.

Results are as follows:

| Biocide | Surviving bacteria (cells per ml) after 3 hours contact time |
|---|---|
| Control (no biocide) | $1.73 \times 10^7$ |
| BIT, 200 ppm. | $8.0 \times 10^8$ |
| LBDAC, 20 ppm. | $8.3 \times 10^3$ |
| Dequadin, 20 ppm. | $1.0 \times 10^3$ |
| BIT (100) + LBDAC (10) | $< 10$ |
| BIT (100) + Dequadin (10) | $2.8 \times 10^2$ |

All concentrations refer to active ingredient.

The synergism shown by BIT and LBDAC acting together is clearly seen. A lower order of synergism is also shown between BIT and Dequadin.

EXAMPLE 12

In this test, combinations of BIT and Domiphen, BIT and Dequadin, and BIT and Phemeride were tested for fungicidal activity against *Aspergillus niger*, the test method being that described in Example 5.

Results are as follows:

| Biocide | Survival of fungus after contact times of | |
|---|---|---|
| | 3 hours | 6 hours |
| Control (no biocide) | +++ | +++ |
| BIT, 100 ppm. | +++ | +++ |
| Dequadin, 20 ppm. | +++ | +++ |
| Domiphen, 20 ppm. | +++ | +++ |
| Phemeride, 20 ppm. | +++ | +++ |
| BIT (100) + Dequadin (10) | +++ | − |
| BIT (100) + Domiphen (10) | +++ | − |
| BIT (100) + Phemeride (10) | +++ | + |

These results indicate the presence of synergistic activity between BIT and Dequadin, BIT and Domiphen, and to a lesser extent between BIT and Phemeride.

Dequadin, Domiphen and Phermeride (Registered Trade Marks) are all quaternary ammonium compounds having pharmaceutical applications, and have the following structures:

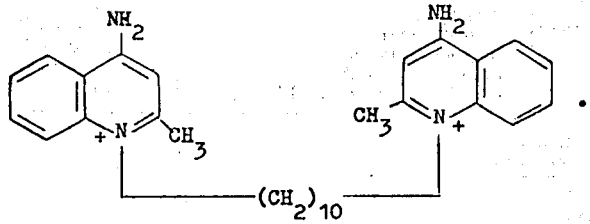 Dequadin

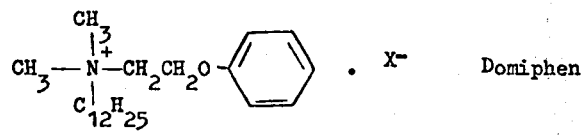 Domiphen

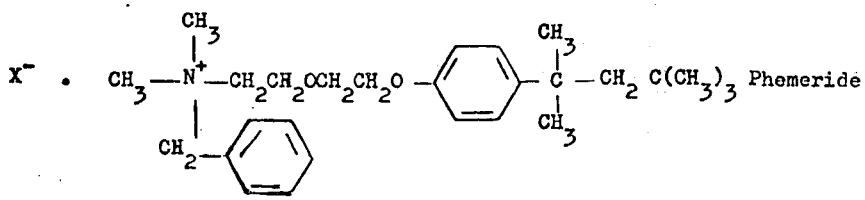 Phemeride

What we claim is:

1. A biocidal composition comprising 1,2-benzisothiazolin-3-one and a quaternary ammonium compound selected from the group consisting of lauryl benzyl dimethyl ammonium chloride and cetyl trimethyl ammonium bromide, the molar ratio of 1,2-benzisothiazolin-3-one to quaternary ammonium compound being in the range 1.0: 0.04 to 1.0: 1.0.

2. The biocidal composition as claimed in claim 1 wherein the quaternary ammonium compound and the 1,2-benzisothiazolin-3-one are in the ratio of one mole benzisothiazolinone for each mole of quaternary ammonium compound.

3. The biocidal composition as claimed in claim 2 wherein the quaternary ammonium compound is lauryl benzyl dimethyl ammonium.

4. A method for protecting aqueous media against contamination by bacteria or fungi and controlling or preventing the proliferation thereof in aqueous media already contaminated thereby, which comprises adding to the aqueous media from 1 to 1000 parts per million of a biocidal composition as claimed in claim 1.

5. A method for the protection of wood against fungal attack wherein the wood is treated with a fungicidally effective amount of a solution in an aqueous or hydrocarbon solvent of a biocidal composition as claimed in claim 1, the solution containing from 50 to 2000 parts per million of the composition.

* * * * *